US012652603B2

(12) United States Patent (10) Patent No.: US 12,652,603 B2

Singh et al. (45) Date of Patent: Jun. 9, 2026

(54) TRAFFIC STEERING OPTIMIZATION

(71) Applicant: GOGO BUSINESS AVIATION LLC, Broomfield, CO (US)

(72) Inventors: Yashvardhan Singh, Erie, CO (US); Michael Schnepf, Chicago, IL (US)

(73) Assignee: GOGO BUSINESS AVIATION LLC, Broomfield, CO (US)

(*) Notice: Subject to any disclaimer, the term of this patent is extended or adjusted under 35 U.S.C. 154(b) by 403 days.

(21) Appl. No.: 18/213,405

(22) Filed: Jun. 23, 2023

(65) Prior Publication Data

US 2024/0430775 A1 Dec. 26, 2024

(51) Int. Cl.
H04W 40/20 (2009.01)
H04W 28/02 (2009.01)

(52) U.S. Cl.
CPC ....... H04W 40/20 (2013.01); H04W 28/0226 (2013.01)

(58) Field of Classification Search
CPC ..... H04W 40/02; H04W 40/20; H04W 28/02; H04W 28/0226; H04B 7/185; H04B 7/18502; H04B 7/18506
See application file for complete search history.

(56) References Cited

U.S. PATENT DOCUMENTS

2015/0318913 A1* 11/2015 Lauer .................... H04W 40/02
455/431
2015/0350996 A1* 12/2015 Lauer ................. H04B 7/18506
370/328

2017/0223134 A1 8/2017 Shah et al.
2019/0230189 A1* 7/2019 Keller ..................... H04L 67/60
2019/0320383 A1* 10/2019 Gardner .............. H04W 64/006
2022/0086696 A1* 3/2022 Onishi .................... H04L 47/24
2022/0239756 A1* 7/2022 Keller ................... H04L 67/568
2022/0386217 A1* 12/2022 Rondeau .............. H04W 40/00
2023/0199636 A1* 6/2023 Hoshino ............. H04W 36/324
370/331
2024/0259910 A1* 8/2024 Dillon .............. H04W 28/0263

FOREIGN PATENT DOCUMENTS

EP 2619970 B1 11/2021
WO WO-2017172796 A1 * 10/2017 ............. H04B 7/185

OTHER PUBLICATIONS

International Application No. PCT/US2024/034902, International Search Report and Written Opinion, mailed Nov. 15, 2024.

* cited by examiner

*Primary Examiner* — Paul H. Masur

(74) *Attorney, Agent, or Firm* — Holland & Hart LLP

(57) ABSTRACT

The present disclosure generally relates to traffic steering, and more particularly relates to traffic steering for an airplane network. In some embodiments, a system may include: a router configured to: (i) tag traffic received via a vehicle network, and (ii) send the tagged traffic to a satellite terminal (STE) modem. The system may further include the STE modem, which may include: (i) a first data access point name (APN) configured to route first traffic to a nearest internet gateway based on a first tag of the first traffic, and (ii) a second APN configured to route second traffic to a datacenter based on a second tag of the second traffic.

20 Claims, 5 Drawing Sheets

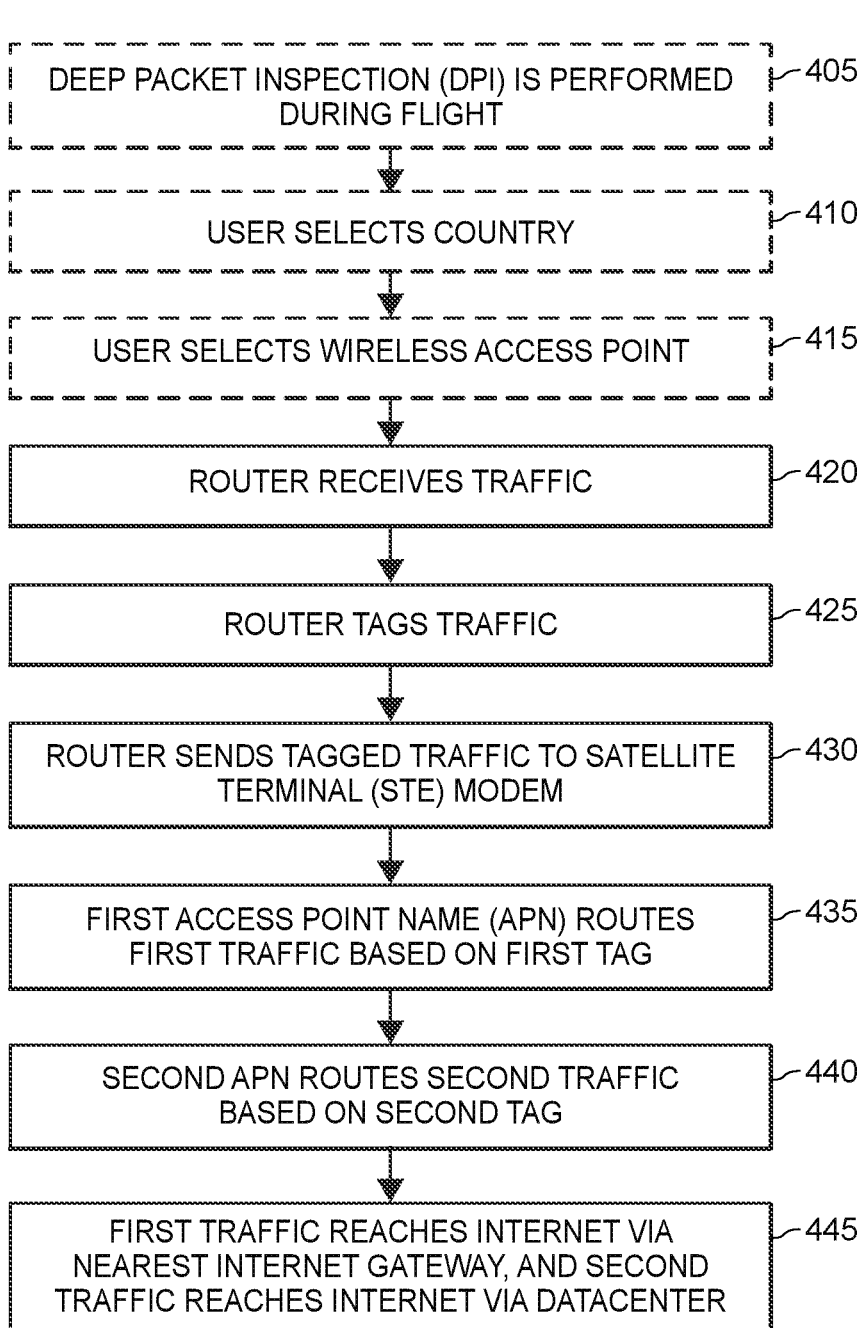

400

┌─────────────────────────────────────────┐
│ DEEP PACKET INSPECTION (DPI) IS PERFORMED │─405
│ DURING FLIGHT                             │
└─────────────────────────────────────────┘

┌─────────────────────────────────────────┐
│ USER SELECTS COUNTRY                      │─410
└─────────────────────────────────────────┘

┌─────────────────────────────────────────┐
│ USER SELECTS WIRELESS ACCESS POINT        │─415
└─────────────────────────────────────────┘

┌─────────────────────────────────────────┐
│ ROUTER RECEIVES TRAFFIC                   │─420
└─────────────────────────────────────────┘

┌─────────────────────────────────────────┐
│ ROUTER TAGS TRAFFIC                       │─425
└─────────────────────────────────────────┘

┌─────────────────────────────────────────┐
│ ROUTER SENDS TAGGED TRAFFIC TO SATELLITE  │─430
│ TERMINAL (STE) MODEM                      │
└─────────────────────────────────────────┘

┌─────────────────────────────────────────┐
│ FIRST ACCESS POINT NAME (APN) ROUTES      │─435
│ FIRST TRAFFIC BASED ON FIRST TAG          │
└─────────────────────────────────────────┘

┌─────────────────────────────────────────┐
│ SECOND APN ROUTES SECOND TRAFFIC          │─440
│ BASED ON SECOND TAG                       │
└─────────────────────────────────────────┘

┌─────────────────────────────────────────┐
│ FIRST TRAFFIC REACHES INTERNET VIA        │─445
│ NEAREST INTERNET GATEWAY, AND SECOND      │
│ TRAFFIC REACHES INTERNET VIA DATACENTER   │
└─────────────────────────────────────────┘

FIG. 4

TRAFFIC STEERING OPTIMIZATION

FIELD

The present disclosure generally relates to traffic steering, and more particularly relates to traffic steering for an airplane network.

BACKGROUND

It is challenging to provide network access to devices on a travelling aircraft. For example, satellite solutions provide network access to devices on a traveling aircraft, but must work across the globe. In this regard, for many proposed solutions, there is a fundamental tradeoff of latency vs. cost.

For example, for an aircraft flying outside the United States, sending the data (e.g., the traffic) to a datacenter in the United States would add latency. This can be problematic, particularly because some applications (e.g., video chat) do not work well if the latency is too high (e.g., >300 ms). On the other hand, building datacenters across the globe would reduce latency, but add a large cost.

The systems and methods disclosed herein provide solutions to these problems and may provide solutions to the ineffectiveness, insecurities, difficulties, inefficiencies, encumbrances, and/or other drawbacks of conventional techniques.

SUMMARY

In one aspect, a system for routing traffic from a vehicle may be provided. The system may include: (1) a router configured to: (i) tag traffic received via a vehicle network, and (ii) send the tagged traffic to a satellite terminal (STE) modem; and (2) the STE modem: (i) configured to receive the tagged traffic, and (ii) comprising: (a) a first data access point name (APN) configured to route first traffic to a nearest internet gateway based on a first tag of the first traffic; and (b) a second APN configured to route second traffic to a datacenter based on a second tag of the second traffic.

In another aspect, a system for routing traffic from a vehicle may be provided. The system may include: (1) a first wireless access point configured to send first traffic to a router; a second wireless access point configured to send second traffic to the router; and (2) the router configured to: (a) tag the first traffic so that the first traffic is routed to a nearest internet gateway, and send the first tagged traffic to a satellite terminal (STE) modem; and (b) tag the second traffic so that the second traffic is routed to a datacenter, and send the second tagged traffic to the STE modem.

In yet another aspect, a computer-implemented method for routing traffic from a vehicle may be provided. The method may include: (1) tagging, via a router, traffic received via a vehicle network; (2) sending the tagged traffic from the router to a satellite terminal (STE) modem; (3) routing, via a first access point name (APN), first traffic included in the tagged traffic to a nearest internet gateway based on a first tag of the first traffic; and (4) routing, via a second APN, second traffic included in the tagged traffic to a datacenter based on a second tag of the second traffic.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 4 shows an example computer-implemented method for routing traffic from a vehicle.

DETAILED DESCRIPTION

Example Overview System for Providing Network Services to an Aircraft

Figure 1:
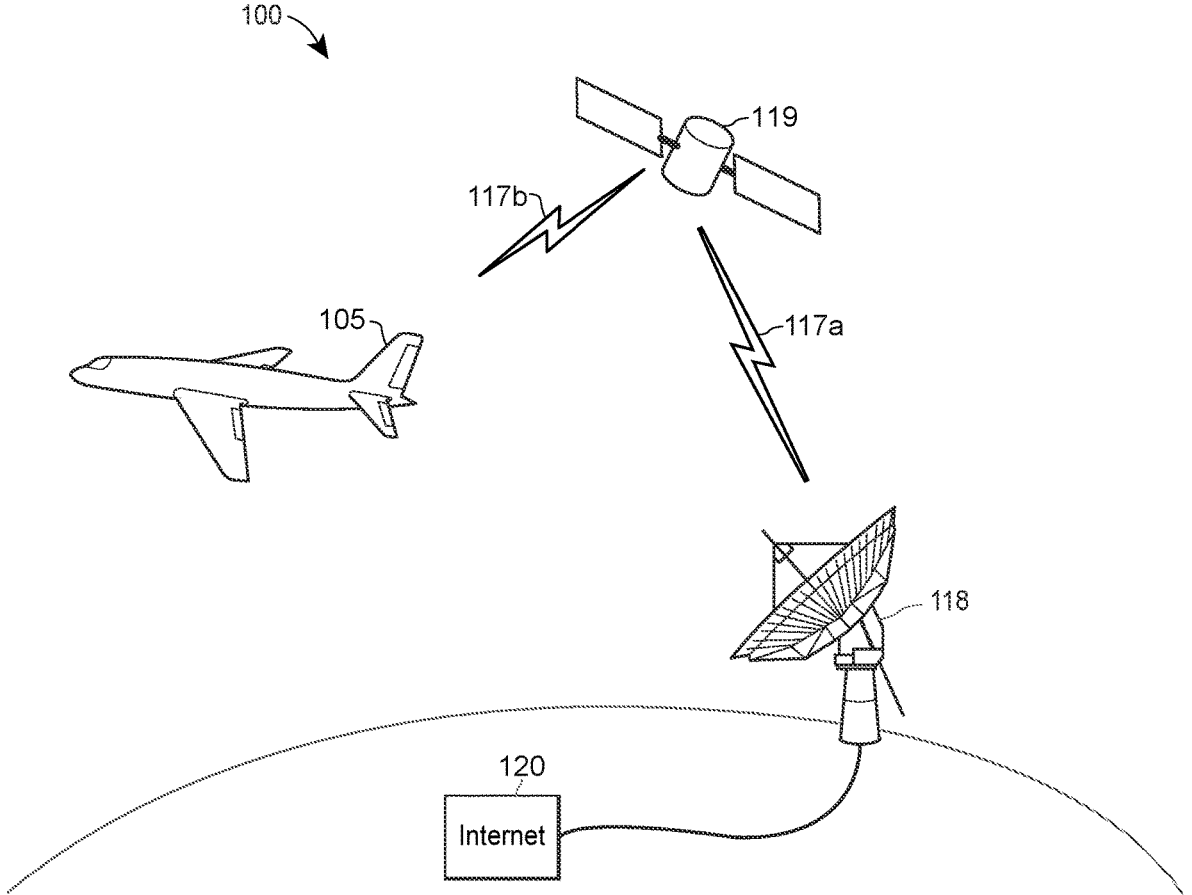
FIG. 1 shows an example system for providing network services to an aircraft.

Satellite solutions provide network access to devices on a traveling aircraft, and must work across the globe. To this end, and broadly speaking, FIG. 1 depicts an example environment 100 for providing network services to an aircraft. The example environment 100 may include one or more vehicles 105. Although the vehicle 105 is depicted as an airplane, it is envisioned that the vehicle 105 may be any vehicle, for example, a bus, a train, a subway, a helicopter, a ship, a subway, a balloon, etc. The vehicle 105 may be equipped with an on-board node (not depicted), such as an Auxiliary Computer Power Unit (ACPU), that supports communications external to the vehicle 105. The on-board node may be coupled to one or more modems communicatively connected to external communication link 117. The external communication link 117 may correspond to a particular communication protocol (e.g., TDMA, GSM, CDMA, GSM, LTE, WiMAX, Wi-Fi, etc.) and/or to a particular frequency band (e.g., $K_a$ band, $K_a$ band, L band, S band, Cellular band, AWS Band, PCS band, an unlicensed band, etc.).

As illustrated, the vehicle 105 may be communicatively coupled to base station 118 via communication link 117. For example, the vehicle 105 may be communicatively coupled to the satellite base station 118 via the external communication link 117. Additionally, the external communication link 117 may include a satellite 119 that acts as a relay between the satellite base station 118 and the vehicle 105. Accordingly, the external communication link 117 may include a first communication link 117a between the satellite base station 118 and the satellite 119 and a second communication link 117b between the satellite 119 and the vehicle 105.

According to aspects, the satellite base station 118 may support communications between the vehicle 105 and the internet 120. In one aspect, the on-board node may establish a network with the satellite base station 118 to route traffic over the communication link 117.

Example System for Routing Traffic

However, for many proposed satellite solutions, there is a fundamental tradeoff of latency vs. cost. For example, for an aircraft flying outside the United States, sending traffic (e.g., data moving across a network) to a datacenter in the United States would add latency. This can be problematic, for example because some applications (e.g., video chat) do not work well if the latency is too high (e.g., >300 ms). On the other hand, building datacenters across the globe would reduce latency, but add a large cost.

In addition, providing network access on a traveling aircraft faces another challenge, namely, satisfying geolocation requirements of applications. For example, some content may be required to be sent through a particular country or other geographic area. For instance, a video entertainment company (e.g., NETFLIX) may require content to be sent through (e.g., originate from) a particular country, such as the United States.

The systems and methods described herein solve these problems and others. For example, some embodiments steer traffic to a particular country when it is required to (or would be advantageous to) steer the traffic to that particular country. Additionally or alternatively, some embodiments steer traffic, such as latency-sensitive traffic (e.g., voice over Internet Protocol (e.g., VOIP) traffic, video chat traffic, etc.) to a nearest internet gateway to reduce the latency.

Figure 2:
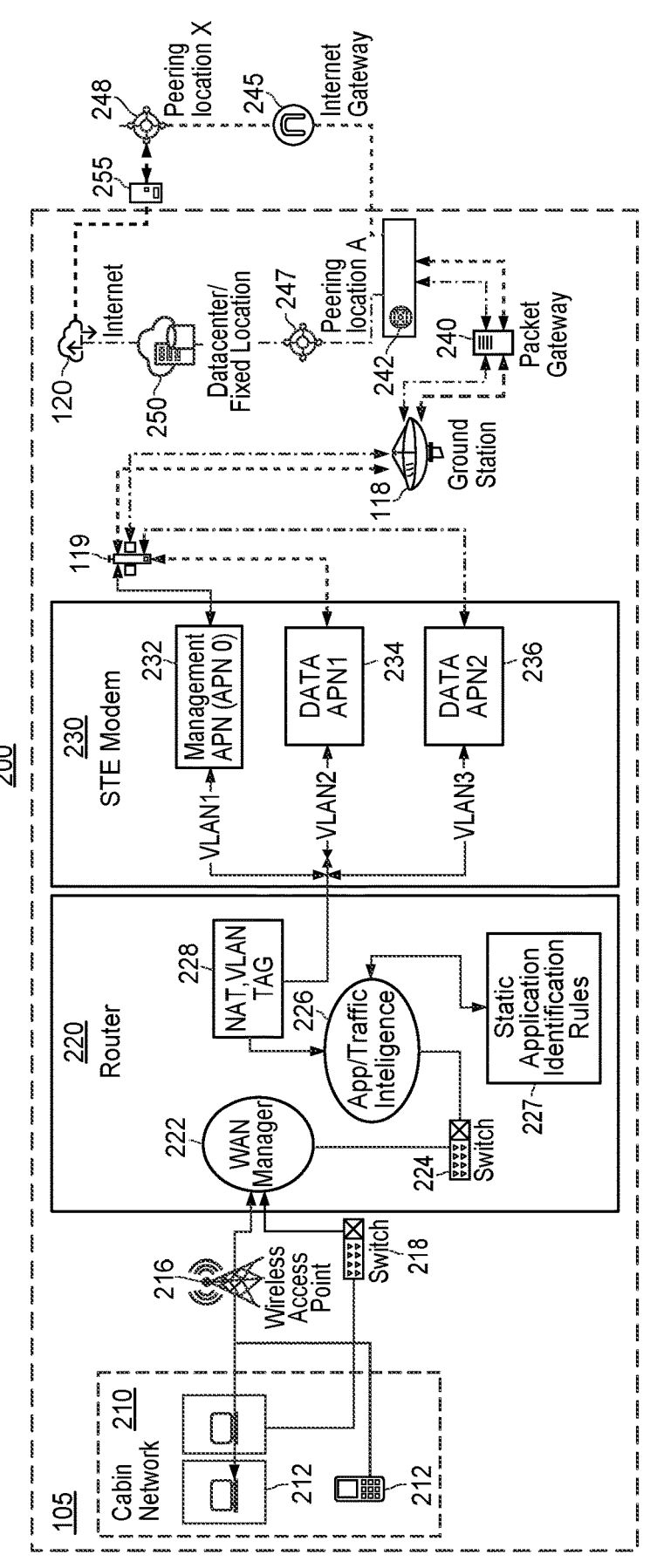
FIG. 2 shows an example system for steering traffic, in accordance with an embodiment including a router with first and second access point names (APNs).

To this end, FIG. 2 shows an example system 200 for steering traffic, in accordance with an embodiment. In this regard, the example vehicle 105 may include a cabin network 210, which may include mobile devices 212 (e.g., smartphones, laptops, tablets, phablets, etc.). It should be appreciated that the cabin network 210 may further include any other additional connected devices (e.g., additional laptops and/or mobile devices, tablets, phablets, etc.) not shown in the example of FIG. 2. Any of the devices 212 may comprise one or more processors.

Any of the devices 212 may be connected to the router 220 via a wireless access point 216 (e.g., if the device is connected wirelessly) or the switch 218 (e.g., if the device is connected via a physical connection, such as an ethernet connection). In some embodiments, the router 220 may comprise an aircraft router unit (ARU), and/or may comprise one or more processors (e.g., one or more router processors, one or more ARU processors, etc.).

The router 220 may include a wide area network (WAN) manager 222 to manage data received from the cabin network 210.

The router 220 may further include switch 224, and app/traffic intelligence 226, static application identification rules 227, and network address translation (NAT)/virtual local area network (VLAN) 228. In some embodiments, the app/traffic intelligence 226 and/or the NAT/VLAN tag 228 may be configured to place a tag on the traffic (e.g., the data, etc.) received from the cabin network 210. The tag may indicate where the traffic is to be sent (e.g., to a particular data center, a particular gateway, a particular geographic area, etc.).

Rules for placing the tags may be held in the static application identification rules 227. For example, there may be a rule for routing latency-sensitive traffic to a nearest internet gateway, a rule for routing traffic from a particular app to a particular datacenter or a datacenter within a particular geographic area, etc.

The router 220 may send traffic to a satellite terminal (STE) modem 230. The STE modem 230 may include a management access point name (APN) 232, a first APN 234, and a second APN 236. Any or all of the management APN 232, the first APN 234, and/or the second APN 236 may act as a gateway for the traffic from the router to any other network, such as the internet 120. In some embodiments, the STE modem may comprise one or more processors (e.g., one or more STE modem processors, etc.).

In operation, the management APN 232 may allow for flexible IP management (e.g., fixed IP's). The management APN 232 may further be configured to provide a custom firewall, and/or a virtual private network (VPN).

In some embodiments, the first APN 234 may be configured to route traffic to internet gateway 245. As will be described elsewhere herein, in some embodiments, the internet gateway that that the first APN 232 is configured to route traffic to may be a nearest internet gateway.

In some embodiments, the second APN 236 may be configured to route traffic to a datacenter or other fixed location, such as datacenter 250. As will be described elsewhere herein, in some embodiments, the datacenter 250 that the second APN 236 routes traffic to may be determined wholly or partially from a selection of a user.

Once the traffic has traveled through the satellite 119 and the ground station 118, the traffic may reach the packet gateway 240, which may act as a point of entry to edge point of presence (POP) 242 (e.g., a point of connection between datacenter(s) and/or internet gateway(s)).

Once the traffic has reached the edge POP 242, it may take one of two routes to reach the internet 120. First (e.g., for traffic to be sent to a particular geolocation, etc.), the traffic may travel through peering location A 247 and the datacenter 250 to reach the internet 120. Alternatively (e.g., for latency sensitive traffic, or traffic not required to be sent to a particular geolocation, etc.), the traffic may be sent to internet gateway 245 (which, in some embodiments, may be an internet gateway nearest the vehicle 150), peering location X 248, and virtual DC 255 to reach the internet 120.

Figure 3:
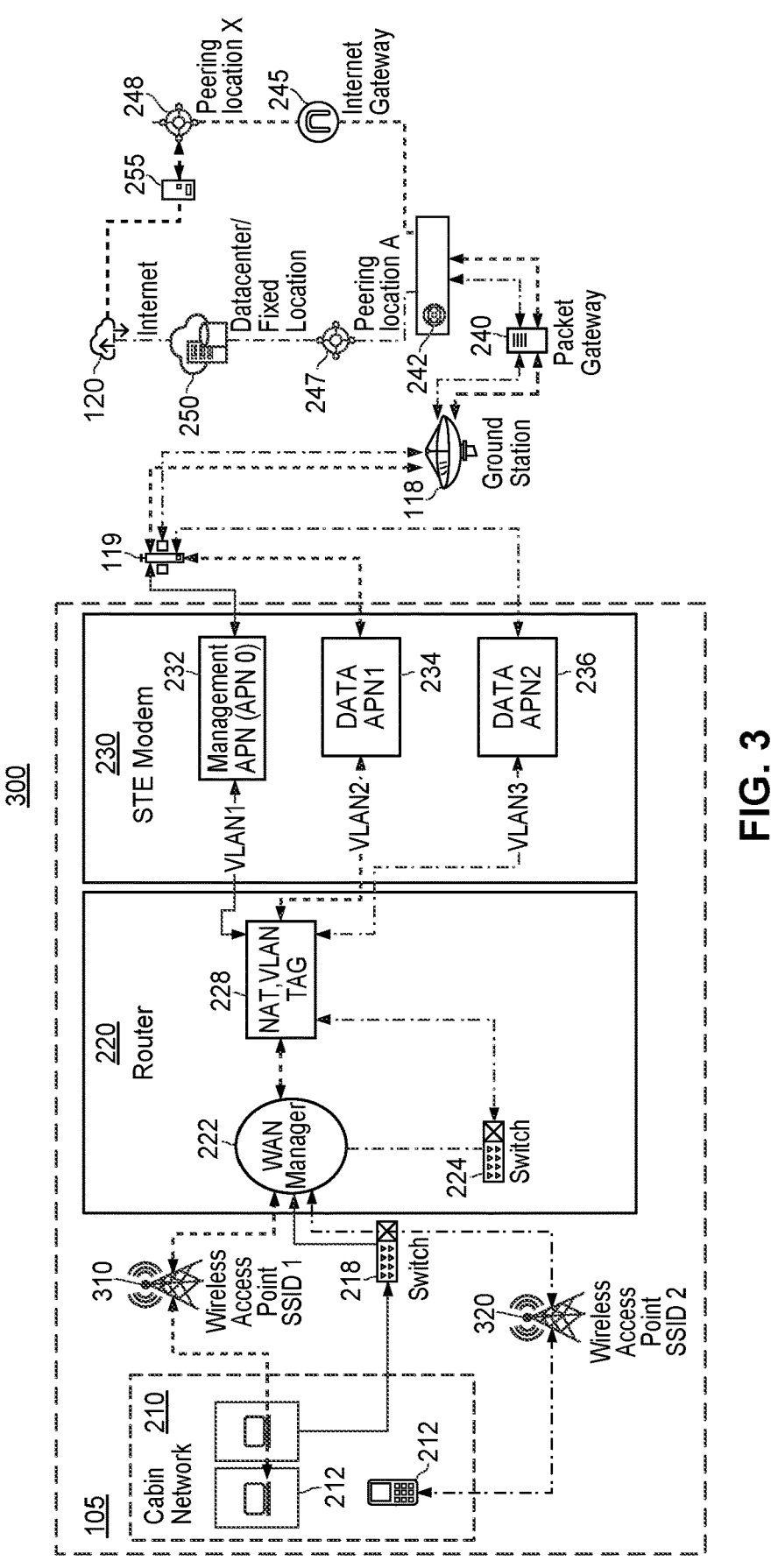
FIG. 3 shows an example system for steering traffic, in accordance with an embodiment including two wireless access points in the vehicle, thereby including independent routing.

FIG. 3 shows an alternative embodiment. More specifically, FIG. 3 depicts an example system 300 including two wireless access points, wireless access point 310 and wireless access point 320. Wireless access point 310 may be associated with service set identifier (SSID) 1, and wireless access point 320 may be associated with SSID 2.

In some implementations, a user (e.g., a passenger on an airplane) may select which wireless access point 310 or 320 to connect her device (e.g., 212, etc.) to. For example, if the user would like to run a video streaming service (e.g., NETFLIX) that is high latency tolerant but is required to a particular geolocation (e.g., the United States), the user may select to connect to wireless access point 320 so that the traffic is sent to the datacenter 250 (e.g., in the United States or other required geolocation) (e.g., rather than a nearest internet gateway, such as internet gateway 245) via the second APN 236.

In another example, if the user would like to run an application that would benefit from low latency and is not restricted based on geolocation (e.g., VOIP, video chat, etc.), the user may select wireless access point 310 so that the traffic is routed to the nearest internet gateway (e.g., internet gateway 245) to reduce latency.

Furthermore, although the example systems 200, 300 illustrate only one of each of the components, any number of the example components are contemplated (e.g., any number of vehicles, cabin networks, laptops, mobile devices, routers, STE modems, APNs, satellites, ground stations, packet gateways, peering locations, internet gateways, datacenters, internets, etc.).

Example Methods

FIG. 4 shows an example computer-implemented method 400 for routing traffic from a vehicle 105.

The example method 400 may begin at optional block 405 when deep packet inspection (DPI) is performed. For example, the mobile device 212 may send data to the router 220, and the router 220 may perform DPI to determine an application (app) associated with the data (e.g., an application being run by the mobile device 212). Identifying an application is advantageous because it may allow, for example, determination of if the application has a geolocation requirement. Thus, if the application has a geolocation requirement, the traffic corresponding to the application may be routed to a datacenter according to the geolocation requirement; and, if not, the traffic corresponding to the application may be routed to a nearest internet gateway (e.g., to reduce latency). In some embodiments, the DPI may also include session marking to indicate where traffic corresponding to the application should be routed.

The determination of if the application has a geolocation requirement may be done by any suitable technique. For example, it may be determined if the application is on a list of applications with geolocation requirements.

Additionally or alternatively, the STE modem 230 may perform the deep packet inspection, and/or determination of the application.

At optional block 410, the user may select a country (e.g., possibly corresponding to an application) or other geographic area. For example, in response to the determination at block 405, the user may be presented (e.g., on a screen of the mobile device 212) with a question asking if the user would like traffic associated with the application routed via a particular country. For example, the user may be presented with a question asking if the traffic associated with an identified video entertainment application should be routed through the United States during the flight.

Additionally or alternatively, at optional block 410, the user may select a country even if optional block 405 was not performed. For example, the user may select that all traffic from mobile device 212 is to be routed through a particular country. In another example, the user may first select (or otherwise identify) an application, and then specify what country the traffic corresponding to the application is to be routed through.

In some examples, the user selects the country from a dropdown list of countries. Additionally or alternatively, the user may type the name of the country into a screen of the mobile device 212.

In some embodiments, upon selection of a country of geographic region, the router 220 and/or STE modem 230 sets a datacenter for traffic to be routed to (e.g., a datacenter within the selected country or geographic region).

At optional block 415, the user may select a wireless access point (e.g., for a particular mobile device 212). For instance, the user may select wireless access point 310, or wireless access point 320. In some examples, the user is presented with a screen (e.g., a screen of the mobile device 212) asking if he would like traffic (e.g., generally, or for a particular application) routed to a particular access point. The screen may also explain that traffic sent to the first access point will be routed to a nearest internet gateway, thereby advantageously reducing latency. The screen may also explain that traffic routed to the second wireless access point may be routed to a data center to thereby meet a geolocation requirement (e.g., a location requirement imposed by a video entertainment application, etc.).

At block 420, the router 220 may receive the traffic (e.g., from any of the wireless access points 216, 310, 320, and/or the switch 218, etc.). In some embodiments, the traffic is received at the WAN manager 222.

At block 425, the router 220 tags the traffic so that it will be routed either to a nearest internet gateway 245 (e.g., to reduce latency), or to a datacenter 250 (e.g., if the traffic has a geolocation requirement). Any or all of the NAT/VLAN tag 228, app/traffic intelligence 226, and/or static application identification rules 227 may perform the tagging.

Figure 5:
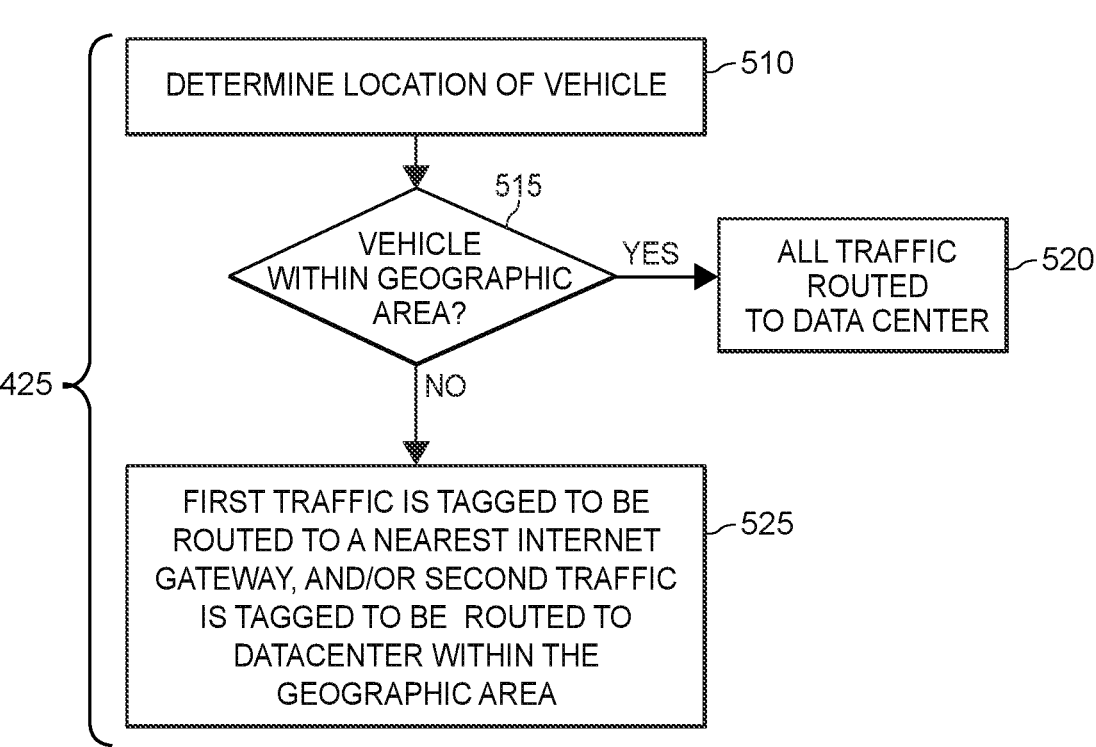
FIG. 5 depicts an example implementation of tagging traffic.

FIG. 5 depicts an example implementation 500 of the tagging that may be performed at block 425. At block 510, the router 220 may determine a location of the vehicle 105. For example, the router 220 may use a geolocation map and/or a technical standard, such as the Aeronautical Radio INC. (ARINC) 429 technical standard, to determine the location of the vehicle 105. Additionally or alternatively, any other data may be used as well (e.g., global positioning satellite (GPS) data, estimates based on speed and direction information of the vehicle along with previously known position data, etc.

At block 515, the router 220 determines if the vehicle 105 is within a geographic area. The geographic area may be any geographic area. For example, the geographic area may be a country (e.g., a country specified by geolocation requirements of an application). For instance, there may be a geolocation requirement of a video entertainment application that the traffic be routed to (e.g., terminated at) the United States; and, in this example, the geographic area may be set to the United States, or the continental United States (CONUS). In this regard, the geographic area may have been determined at block 405 (e.g., DPI identifies an application with a geolocation requirement, and a geographic area associated with the geolocation requirement). Additionally or alternatively, the geographic area may have been determined at block 410 (e.g., the user-identified country is the geographic area, etc.). Additionally or alternatively, the router 220 may determine the geographic area by inspecting the traffic during the flight, determining an application with a geolocation requirement, and determining a geographic area associated with the geolocation requirement.

If the vehicle 105 is within the geographic area, at block 520, the router 220 may tag the data so that all traffic is routed to a datacenter 250 within the geographic area (e.g., tag the traffic so that it is routed by APN 2). Alternatively, although not shown in FIG. 5, all the traffic may be tagged so that it is routed to the nearest internet gateway. Additionally or alternatively, in some embodiments, while the vehicle 105 is in the geographic area, the router 220 may tag all traffic so that it is routed to a datacenter 250 within the geographic region regardless of the user's selection of a wireless access point at block 415 (e.g., thus possibly overriding the user's selection of a wireless access point until the vehicle 105 has left the geographic region). Additionally or alternatively, in some embodiments, while the vehicle 105 is in the geographic area, the router 220 may tag all traffic so that it is routed to a nearest internet gateway 245 within the geographic region regardless of the user's selection of a wireless access point at block 415 (e.g., thus possibly overriding the user's selection of a wireless access point until the vehicle 105 has left the geographic region).

If, at block 515, the vehicle 105 is determined not to be within the geographic area, at block 525, first traffic (e.g., traffic not associated with a geolocation requirement, and/or latency sensitive traffic) is tagged to be routed to a nearest internet gateway 245 and/or second traffic (e.g., traffic associated with a geolocation requirement) is tagged to be routed to the datacenter 250 within the geographic area.

The nearest internet gateway 245 (e.g., the nearest internet gateway to the vehicle's current location) may be determined by any suitable technique. For example, the location of the vehicle determined at block 510 may be compared to known locations of internet gateways. Advantageously, as mentioned elsewhere herein, using the nearest internet gateway (rather than an internet gateway that is farther away) reduces latency.

Moreover, it should be appreciated that FIG. 5 is only an example, and other implantations of tagging are possible. For example, the router 220 may tag all traffic received form the first wireless access point 310 (e.g., traffic received with SSID 1) so that it is routed to the nearest internet gateway 245; and/or may tag all traffic received from the second wireless access point 320 (e.g., traffic received with SSID 2) so that it is routed to the datacenter 250 (e.g., a datacenter within the geographic area).

Returning now to the example of FIG. 4, at block 430, the router 220 sends the tagged traffic to the STE modem 230.

At block 435, the first APN 234 routes first traffic based on tag(s) placed on the first traffic (first tag(s)). Examples of the first traffic include latency sensitive traffic (e.g., VOIP traffic, video chat traffic, etc.). The first traffic may be routed to a nearest internet gateway, thereby advantageously reducing latency.

At block 440, the second APN 236 routes second traffic based on tag(s) placed on the second traffic (second tag(s)). Examples of the second traffic include traffic associated with a geolocation requirement, such as video entertainment traffic, etc. The second traffic may be routed to a datacenter within the geographic area, thereby advantageously meeting the traffic's geolocation requirement. In some examples, if there is more than one datacenter within the geographic region, the second traffic is sent to the datacenter with the lowest latency.

At block 445, the first traffic reaches the internet 120 via the nearest internet gateway 245, and the second traffic reaches the internet 120 via the datacenter 250.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Aspects

Aspect 1. A system for routing traffic from a vehicle, the system comprising:

a router configured to:
(i) tag traffic received via a vehicle network, and (ii) send the tagged traffic to a satellite terminal (STE) modem; and the STE modem: (i) configured to receive the tagged traffic, and (ii) comprising:
a first data access point name (APN) configured to route first traffic to a nearest internet gateway based on a first tag of the first traffic; and
a second APN configured to route second traffic to a datacenter based on a second tag of the second traffic.

Aspect 1A. The system of aspect 1, wherein the tagged traffic comprises the first traffic and the second traffic.

Aspect 1B. The system of aspect 1, wherein the STE modem further comprises a management APN.

Aspect 2. The system of aspect 1, wherein the first traffic comprises: voice over Internet Protocol (VOIP), and/or traffic associated with video chat.

Aspect 3. The system of any of aspects 1-2, wherein the second traffic comprises traffic associated with video entertainment.

Aspect 4. The system of any of aspects 1-3, wherein the router comprises an aircraft router unit (ARU).

Aspect 5. The system of any of aspects 1-4, further comprising one or more processors configured to:
receive, from a mobile device of a user, a selection of a country; and
set the datacenter to be a datacenter geographically located in the selected country.

Aspect 6. The system of aspect 5, wherein the one or more processors are one or more processors of the STE modem.

Aspect 7. The system of any of aspects 1-6, further comprising one or more processors configured to:
receive, from a mobile device of a user, a selection of a country;
determine a lowest latency datacenter geographically within the selected country; and
set the datacenter to be the determined datacenter.

Aspect 8. The system of any of aspects 1-7, wherein the router is further configured to:
identify a current location of a vehicle based on both a geolocation map and technical standard; and
determine the nearest internet gateway based on the identified current location.

Aspect 9. The system of any of aspects 1-8, wherein the router is configured to:
when a vehicle is inside a geographic area, tag the traffic so that all traffic is routed to the datacenter; and
when the vehicle is not inside the geographic area, tag the traffic so that: (i) traffic associated with a geolocation requirement is routed to the datacenter, and (ii) traffic not associated with the geolocation requirement is routed to the nearest internet gateway.

Aspect 10. The system of any of aspects 1-9, wherein a vehicle comprises an airplane, and wherein the router is further configured to:
use a deep packet inspection (DPI) system to determine an application of a mobile device of a user;
determine if the application has a geolocation requirement; and
during the flight of the airplane:
if the application has the geolocation requirement, tag traffic associated with the application so that the traffic associated with the application is routed to the datacenter; and
if the application does not have the geolocation requirement, tag traffic associated with the application so that the traffic associated with the application is routed to the nearest internet gateway.

Aspect 11. The system of any of aspects 1-10, wherein the router is further configured to tag the traffic by:
tagging traffic received from a first wireless access point so that the traffic received from the first wireless access point is routed to the nearest internet gateway; and
tagging traffic received from a second wireless access point so that the traffic received from the second wireless access point is routed to the datacenter.

Aspect 12. A system for routing traffic from a vehicle, the system comprising:

a first wireless access point configured to send first traffic to a router;

a second wireless access point configured to send second traffic to the router; and the router configured to:

tag the first traffic so that the first traffic is routed to a nearest internet gateway, and send the first tagged traffic to a satellite terminal (STE) modem; and tag the second traffic so that the second traffic is routed to a datacenter, and send the second tagged traffic to the STE modem.

Aspect 13. The system of aspect 12, further comprising the STE modem configured to receive the first tagged traffic and the second tagged traffic from the router, the STE modem comprising:

a first data access point name (APN) configured to route first traffic to the nearest internet gateway based on a first tag of the first traffic; and a second APN configured to route second traffic to the datacenter based on a second tag of the second traffic.

Aspect 14. The system of aspect 13, wherein the first wireless access point, the second wireless access point, the router, and the STE modem are all comprised within a vehicle.

Aspect 15. The system of any of aspects 11-14, further comprising one or more processors configured to:

receive, from a mobile device of a user, a selection of the first wireless access point or the second wireless access point; and connect the mobile device of the user to the first wireless access point or the second wireless access point according to the selection.

Aspect 16. A computer-implemented method for routing traffic from a vehicle, the method comprising:

tagging, via a router, traffic received via a vehicle network;

sending the tagged traffic from the router to a satellite terminal (STE) modem;

routing, via a first access point name (APN), first traffic included in the tagged traffic to a nearest internet gateway based on a first tag of the first traffic; and routing, via a second APN, second traffic included in the tagged traffic to a datacenter based on a second tag of the second traffic.

Aspect 16A. The computer-implemented method of aspect 16, wherein the STE modem comprises the first APN and the second APN.

Aspect 17. The computer-implemented method of aspect 16, wherein the first traffic comprises: voice over Internet Protocol (VOIP), and/or traffic associated with video chat.

Aspect 18. The computer-implemented method of any of aspects 16-17, wherein the second traffic comprises traffic associated with video entertainment.

Aspect 19. The computer-implemented method of any of aspects 16-18, wherein the router comprises an aircraft router unit (ARU).

Aspect 20. The computer-implemented method of any of aspects 16-19, further comprising, via one or more processors:

receiving, from a mobile device of a user, a selection of a country; and setting the datacenter to be a datacenter geographically located in the selected country.

Aspect 21. The computer-implemented method of aspect 20, wherein the one or more processors are one or more processors of the STE modem.

Aspect 22. The computer-implemented method of any of aspects 16-21, further comprising, via one or more processors:

receiving, from a mobile device of a user, a selection of a country;

determining a lowest latency datacenter geographically within the selected country; and setting the datacenter to be the determined datacenter.

Aspect 23. The computer-implemented method of aspect 22, wherein the one or more processors comprise one or more processors of the router, and/or one or more processors of the STE modem.

Aspect 24. The computer-implemented method of any of aspects 16-23, further comprising, with the router:

identifying a current location of a vehicle based on both a geolocation map and technical standard; and determining the nearest internet gateway based on the identified current location.

Aspect 25. The computer-implemented method of any of aspects 16-24, further comprising, with the router:

when a vehicle is inside a geographic area, tagging the traffic so that all traffic is routed to the datacenter; and when the vehicle is not inside the geographic area, tagging the traffic so that: (i) traffic associated with a geolocation requirement is routed to the datacenter, and (ii) traffic not associated with the geolocation requirement is routed to the nearest internet gateway.

Aspect 26. The computer-implemented method of any of aspects 16-25, wherein a vehicle comprises an airplane, and wherein the method further comprises, with the router:

using a deep packet inspection (DPI) system to determine an application of a mobile device of a user;

determining if the application has a geolocation requirement; and during the flight of the airplane:

if the application has the geolocation requirement, tagging traffic associated with the application so that the traffic associated with the application is routed to the datacenter; and if the application does not have the geolocation requirement, tagging traffic associated with the application so that the traffic associated with the application is routed to the nearest internet gateway.

Aspect 27. The computer-implemented method of any of aspects 16-26, further comprising, with the router, tagging the traffic by:

tagging traffic received from a first wireless access point so that the traffic received from the first wireless access point is routed to the nearest internet gateway; and tagging traffic received from a second wireless access point so that the traffic received from the second wireless access point is routed to the datacenter.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing." "calculating." "determining," "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A system, comprising:
a router configured to:
tag traffic received via a vehicle network based at least in part on whether the traffic corresponds to an application with a geolocation requirement, the traffic comprising at least a first subset of traffic associated with a first tag and a second subset of traffic associated with a second tag; and
send the tagged traffic to a satellite terminal (STE) modem; and
the STE modem configured to receive the tagged traffic and comprising:
a first data access point name (APN) configured to route, based at least in part on the first tag of the first subset of the traffic, the first subset of the traffic to an internet gateway of a plurality of internet gateways that is closest to a current location of a vehicle; and
a second APN configured to route the second subset of the traffic to a datacenter in accordance with a respective geolocation requirement of a respective application corresponding to the second subset of the traffic based on the second tag of the second subset of the traffic.

2. The system of claim 1, wherein the first subset of the traffic comprises: voice over Internet Protocol (VOIP), other traffic associated with video chat, or both.

3. The system of claim 1, wherein the second subset of the traffic comprises traffic associated with video entertainment.

4. The system of claim 1, wherein the router comprises an aircraft router unit (ARU).

5. The system of claim 1, further comprising one or more processors configured to:
receive, from a mobile device of a user, a selection of a country; and
set the datacenter to be a datacenter geographically located in the selected country.

6. The system of claim 5, wherein the one or more processors are one or more processors of the STE modem.

7. The system of claim 1, further comprising one or more processors configured to:
receive, from a mobile device of a user, a selection of a country;
determine a lowest latency datacenter geographically within the selected country; and
set the datacenter to be the determined datacenter.

8. The system of claim 1, wherein the router is further configured to:
identify the current location of the vehicle based on both a geolocation map and technical standard; and
determine the internet gateway of the plurality of internet gateways that is closest to the current location of the vehicle based on the identified current location.

9. The system of claim 1, wherein the router is configured to:
when the vehicle is inside a geographic area, tag the traffic so that all traffic is routed to the datacenter; and
when the vehicle is not inside the geographic area, tag the traffic so that:
the traffic associated with the geolocation requirement is routed to the datacenter; and

the traffic not associated with the geolocation requirement is routed to the internet gateway of the plurality of internet gateways that is closest to the current location of the vehicle.

10. The system of claim 1, wherein the router is further configured to:

use a deep packet inspection (DPI) system to identify the application, the application comprising a first application of a mobile device of a user;

determine if the application has the geolocation requirement; and during motion of the vehicle:

if the application has the geolocation requirement, tag traffic associated with the application so that the traffic associated with the application is routed to the datacenter; and if the application does not have the geolocation requirement, tag traffic associated with the application so that the traffic associated with the application is routed to the internet gateway of the plurality of internet gateways that is closest to the current location of the vehicle.

11. The system of claim 1, wherein the router is further configured to tag the traffic by:

tagging traffic received from a first wireless access point so that the traffic received from the first wireless access point is routed to the internet gateway of the plurality of internet gateways that is closest to the current location of the vehicle; and tagging traffic received from a second wireless access point so that the traffic received from the second wireless access point is routed to the datacenter.

12. A system, comprising:

a first wireless access point configured to send first traffic to a router;

a second wireless access point configured to send second traffic to the router; and the router configured to:

tag the first traffic so that a first subset of traffic of the first traffic is routed to an internet gateway of a plurality of internet gateways that is closest to a current location of a vehicle;

send the first tagged traffic, after tagging the first traffic with a first tag, to a satellite terminal (STE) modem;

tag the second traffic so that a second subset of traffic of the second traffic is routed to a datacenter in accordance with a respective geolocation requirement of a respective application corresponding to the second traffic; and send the second tagged traffic, after tagging the second traffic with a second tag, to the STE modem.

13. The system of claim 12, further comprising the STE modem configured to receive the first tagged traffic and the second tagged traffic from the router, the STE modem comprising:

a first data access point name (APN) configured to route, based at least in part on the first tag of the first traffic, the first subset of traffic to the internet gateway of the plurality of internet gateways that is closest to the current location of the vehicle; and a second APN configured to route the second subset of traffic to the datacenter in accordance with the respective geolocation requirement of a respective application corresponding to the second traffic based on the second tag of the second traffic.

14. The system of claim 13, wherein the first wireless access point, the second wireless access point, the router, and the STE modem are all comprised within the vehicle.

15. The system of claim 12, further comprising one or more processors configured to:

receive, from a mobile device of a user, a selection of the first wireless access point or the second wireless access point; and connect the mobile device of the user to the first wireless access point or the second wireless access point according to the selection.

16. A computer-implemented method, comprising:

tagging, via a router, traffic received via a vehicle network based at least in part on whether the traffic corresponds to an application with a geolocation requirement, the traffic comprising at least a first subset of traffic associated with a first tag and a second subset of traffic associated with a second tag;

sending the tagged traffic from the router to a satellite terminal (STE) modem;

routing, via a first access point name (APN), based at least in part on the first tag of the first subset of traffic of the tagged traffic, the first subset of traffic of the traffic to an internet gateway of a plurality of internet gateways that is closest to a current location of a vehicle; and routing, via a second APN, the second subset of traffic of the traffic to a datacenter in accordance with a respective geolocation requirement of a respective application corresponding to the second subset of the traffic based on a second tag of the second subset of the traffic.

17. The computer-implemented method of claim 16, wherein the first subset of the traffic comprises: voice over Internet Protocol (VOIP), other traffic associated with video chat, or both.

18. The computer-implemented method of claim 16, wherein the second subset of the traffic comprises traffic associated with video entertainment.

19. The computer-implemented method of claim 16, wherein the router comprises an aircraft router unit (ARU).

20. The computer-implemented method of claim 16, further comprising, via one or more processors:

receiving, from a mobile device of a user, a selection of a country; and setting the datacenter to be a datacenter geographically located in the selected country.

* * * * *